United States Patent [19]

Nagayama et al.

[11] Patent Number: 5,648,150

[45] Date of Patent: Jul. 15, 1997

[54] MAGNETIC RECORDING MEDIUM HAVING A BACKCOAT LAYER CONTAINING CARBON BLACK AND PLATELET INORGANIC POWDER

[75] Inventors: Yasushi Nagayama, Hitachinaka; Osamu Kobayashi, Tomobe-Cho; Ikuo Matsumoto, Mito, all of Japan

[73] Assignee: Victor Company of Japan, Ltd., Yokohama, Japan

[21] Appl. No.: 523,611

[22] Filed: Sep. 5, 1995

[30] Foreign Application Priority Data

Sep. 5, 1994 [JP] Japan ................................. 6-238380

[51] Int. Cl.$^6$ ........................................................ G11B 5/68
[52] U.S. Cl. .......................... 428/216; 428/323; 428/324; 428/328; 428/329; 428/332; 428/336; 428/408; 428/694 BB; 428/900
[58] Field of Search .......................... 428/694 BB, 216, 428/323, 324, 328, 329, 332, 336, 408, 900

[56] References Cited

U.S. PATENT DOCUMENTS

| | | | |
|---|---|---|---|
| 4,578,311 | 3/1986 | Ishikuro et al. | 428/336 |
| 5,075,180 | 12/1991 | Ishikuro et al. | 428/694 |
| 5,501,896 | 3/1996 | Ueyama et al. | 428/323 |

FOREIGN PATENT DOCUMENTS

| | | |
|---|---|---|
| 0 322 826 | 12/1988 | European Pat. Off. |
| 1-60819 | 3/1989 | Japan . |
| 64-60819 | 3/1989 | Japan . |
| 4-195819 | 7/1992 | Japan . |
| 4-285726 | 10/1992 | Japan . |
| 4-285725 | 10/1992 | Japan . |
| 4-287525 | 10/1992 | Japan . |
| 6-111305 | 4/1994 | Japan . |

OTHER PUBLICATIONS

Database WPI, Week 9247, Derwent Publications Ltd., London, GB; & JP-A-04 285 725 (Matsushita Elec Ind), Oct. 9, 1992.

*Primary Examiner*—Stevan A. Resan
*Attorney, Agent, or Firm*—Jacobson, Price, Holman & Stern, PLLC

[57] ABSTRACT

In the magnetic recording medium with a total thickness of 12.5 μm, a magnetic layer is formed on one surface of a non-magnetic supporter, and a back coat layer with a thickness of 1.0 μm and composed of solid powder and a binder is formed on the other surface of the same non-magnetic supporter. The solid powder contains platelet inorganic powder and carbon black powder mixed in such a mix rate that the carbon black powder is between 5 and 20 parks by weight, when the platelet inorganic powder is 100 parts by weight. In spite of the fact that the total thickness of the magnetic recording medium is as thin as 12.5 μm, a sufficient mechanical strength and a sufficient travel stability can be both obtained, while preventing tape damage such as breakage, wrinkles, etc.

3 Claims, No Drawings

MAGNETIC RECORDING MEDIUM HAVING A BACKCOAT LAYER CONTAINING CARBON BLACK AND PLATELET INORGANIC POWDER

BACKGROUND OF THE INVENTION

1. Field of the Invention

The present invention relates to a magnetic recording medium such as a magnetic tape, a magnetic disc, etc. More specifically, this invention relates to a magnetic recording medium provided with both a sufficient mechanical strength and a travel stability, even when its total thickness is adjusted to 12.5 μm or less.

2. Description of the Prior Art

Recently, a magnetic recording medium which can keep recording signals for many hours has been required. As a result, there exists a necessity to reduce the total thickness of the recording medium as Thin as possible, in particular in the magnetic tape (e.g., a video tape) accommodated in a casing under wound-up condition. Here, however, when the thickness of the tape is simply thinned, since the mechanical strength thereof is reduced, there arise various problems in that the medium itself is subjected to damage (e.g., breakage, wrinkles, etc.) To solve these problems, such a magnetic recording medium has been proposed that a layer (using flat inorganic powder and carbon black as a filler) is sandwiched either between a rear side of a non-magnetic supporter and a magnetic layer or between the supporter and a back coat layer or layers with such filler are sandwiched between the supporter and the magnetic layer and between the supporter and the back coat layer. Such a magnetic recording medium is disclosed in Japanese Published Unexamined (Kokai) Patent Application Nos. 64-60819, 4-285725, 4-285726, and 4-195819, for instance.

In The above-mentioned prior art magnetic recording medium, however, when the total thickness thereof is reduced down to as thin as 12.5 μm or less (a target value of the Inventors), it is impossible to obtain a sufficient mechanical strength and a sufficient travel stability. In practice, the Inventors manufactured the above-mentioned prior art recording medium whose thickness was reduced down to 12.5 μm or less in total thickness for various tests. The test results were such that the tapes were damaged, broken or wrinkled due to the contact with a guide pole for guiding the tape travel.

In addition, in the above-mentioned Patent 64-60819, the quantity of carbon black contained in the back coat layer as an additive is defined as 50 to 300 parts by weight (referred to as wt. parts, sometimes hereinafter). However, when this tape is used as a magnetic tape with a thickness equal to or less than 12.5 μm, since the added carbon black is excessive, the mechanical strength of the magnetic tape is extremely reduced, as a result the magnetic tape is subjected to edge damage (e.g., breakage, wrinkles, etc.)

As described above, when the thickness of the prior art magnetic recording tape is simply reduced as thin as 12.5 μm or less, the tape cannot be used in practice.

SUMMARY OF THE INVENTION

Accordingly, it is the object of the present invention to provide a magnetic recording medium which can provide both a sufficient mechanical strength and a travel stability simultaneously, without being subjected to damage, breakage, wrinkles, etc, even when the total thickness thereof is reduced down to as thin as 12.5 μm or less.

To achieve the above-mentioned object, the present invention provides a magnetic recording medium having a magnetic layer formed one side surface of a non-magnetic supporter and a back coat layer formed on the other side of the non-magnetic supporter, the back coat layer being composed of a solid powder and a binder, wherein a thickness of the back coat layer is 1.0 μm or less, and a total thickness of the magnetic recording medium is 12.5 μm or less; and the solid powder contains platelet inorganic powder and carbon black powder in such a mix rate that the carbon black powder is between 5 and 20 parts by weight, relative to 100 parts by weight of the platelet inorganic powder.

Here, it is preferable that in the back coat layer, the binder and the platelet inorganic powder are mixed in a such a mix rate that the binder is between 15 and 40 parts by weight, relative to 100 parts by weight of the platelet inorganic powder.

Further, it is preferable that the platelet inorganic powder is any one of or a mixture of substances selected from the group consisting of $\alpha$—$Fe_2O_3$, Ba—Fe, kaolin, mica, and zinc oxide. An average particle diameter of the platelet inorganic powder lies between 0.5 and 3.0 μm and a platelet aspect ratio of the particle diameter to thickness thereof lies between 30 and 50. The carbon black powder is any one of or a mixture of black substances selected from the group consisting of furnace black, thermal black, black for color, and acetylene black. An average particle diameter of the carbon block powder lies between 20 and 300 nm.

DETAILED DESCRIPTION OF THE PREFERRED EMBODIMENTS

As a result of various experiments and researches, the Inventors have found that the problem can be solved preferably when the mix rate (compound proportion) of the platelet inorganic powder (solid powder in the back coat layer) and the carbon black powder is determined in such a way that the carbon black is 5 parts by weight or more but 20 parts by weight or less (referred to as wt. parts, hereinafter) when the platelet inorganic powder is 100 parts by weight.

When the mix rate of the carbon black is smaller than the above-mentioned range, the surface frictional coefficient of the back coat layer increases, so that a tape tension during traveling increases, with the result that edge damage occurs due to the contact with the guide pole for guiding the tape travel. On the other hand, when the mix rate of The carbon black is larger than the above-mentioned range, the mechanical strength of the magnetic tape (i.e., dynamic buckling strength or bending strength) is lowered, with the result that the edge damage occurs during traveling.

Further, the Inventors have studied the mix rate of the binder (bonding agent or material) and the platelet inorganic powder on condition that the above-mentioned mix rate of the back coat layer (i.e., the mix rate of the carbon block and the platelet inorganic power) is maintained. As a result, the Inventors have found that the problem can be preferably solved when binder is between 15 parts by weight and 40 parts by weight, when the platelet inorganic powder is 100 parts by weight.

Here, when the mix rate of the binder is smaller than the above-mentioned range, the dispersibility of the carbon black drops gradually, so that the traveling durability (e.g., film scrape off) deteriorates during tape traveling. On the other hand, when the mix rate of the binder is larger than the above-mentioned range, since the filling density of the inorganic powder is lowered, the mechanical strength drops slightly, with the result that the edge damage slightly occurs.

The above-mentioned platelet inorganic powder is formed of any one of or a combination of α—Fe$_2$O$_3$, kaolin, mica, zinc oxide, etc. Further, it is preferable that the average particle diameter is 0.5 μm or more but 3.0 μm or less, and that the platelet aspect ratio (the ratio of an average diameter to a plate thickness) of the inorganic powder is 30 or more but 50 or less.

The carbon black powder is any one of or a mixture of furnace black (a kind of carbon black formed by a furnace), thermal black, black used as color, acetylene black, etc. Further, it is preferable that the average particle diameter is 20 nm or more but 300 nm or less.

Further, in the back coat layer, any one of or a mixture of fatty acid and fatty acid ester, fluorine denatured silicone oil, etc., is mixed as a lubricant.

As the binder of the back coat layer, the same as the prior art binder can be used. These binders are thermoplastic resin (vinyl chloride, vinyl acetate copolymer, etc.), thermosetting resin, reactive resin, and a mixture of these.

Further, the magnetic layer can be formed by the well-known method such as a method of applying a ferromagnetic powder together with a binder, method of forming a film by evaporating ferromagnetic substance, etc. Here, the ferromagnetic powder used for the magnetic layer is not specified in particular. Therefore, any powder of metallic oxide containing γ—Fe$_2$O$_3$, Co or coated with γ—Fe$_2$O$_3$, Fe$_3$O$_4$, CrO$_2$, etc., or metal or alloy powder of Fe, Fe—Ni, Fe—Co—Ni, etc., or magnetic platelet crystal such as Ba ferrite, etc. can be used. Further the shapes of the ferromagnetic powder is not limited and therefore any of spherical powder, needle-shaped powder, platelet-shaped powder, etc. can be used.

Various examples of the present invention will be described hereinbelow, in comparison with various comparative examples.

EXAMPLE 1

On the surface of polyethylene naphthalate layer with a thickness of 9.5 μm, a magnetic paint was applied by the following compositions and methods so that the magnetic coating with a thickness of 2.5 μm could be obtained. Further, the coated film was processed for magnetic orientation, dried, and further processed for calendering (for surface smoothing), to form a magnetic film with a thickness of 2.0 μm. After that, the back coat layer coating liquid was applied as the back coat layer on the surface on which the magnetic film (the polyethylene naphtatate layer) was not coated by the following compositions and methods so that the back coat layer with a thickness of 1.0 μm could be obtained after dried. Further, after the liquid coating, the coated film was processed for magnetic orientation, dried, and further processed for calendering (for surface smoothing), to form an original magnetic coated film rolled material (before slit off) with a total thickness of 12.5 μm less. Here, the original magnetic coated film rolled material implies an original tape material obtained by forming a magnetic layer on a substrate film which is not yet slit away to a predetermined tape width. The width thereof was about 60 cm to 1 m. The original magnetic coated film rolled material before slit off was heat treated to 50° C. for 60 hours for thermo-hardening. After that, the original magnetic coated film material was slit off to a recording tape with a width of 0.5 inch, as a video tape sample (Example 1).

(1) Formation of magnetic paint
Composition

| | |
|---|---|
| Co-γ-Fe$_2$O$_3$ magnetic powder | 100 wt. parts |
| Vinyl chloride-vinyl acetate copolymer | 10 wt. parts |
| Polyurethane resin | 10 wt. parts |
| α-alumina (average particle dia. 0.3 μm) | 6 wt. parts |
| Carbon black | 1 wt. part |
| Methyl-ethyl-ketone | 100 wt. parts |
| Toluene | 100 wt. parts |

The following additives were added to a magnetic paint (in which the above compositions are dispersed) by agitating the paint with a disperser, to form the magnetic paint.

| | |
|---|---|
| Stearic acid | 1 wt. part |
| Butyl stearate | 1 wt. part |
| Polyisocyanate | 5 wt. parts |

(2) Formation of back coat paint
Composition

| | |
|---|---|
| α-Fe$_2$O$_3$ | 100 wt. parts |
| Carbon black | 5 wt. parts |
| Vinyl chloride-vinyl acetate copolymer | 15 wt. parts |
| Polyurethane resin | 15 wt. parts |
| Methyl-ethyl-ketone | 100 wt. parts |
| Toluene | 100 wt. parts |

The following additives were added to the back coat paint (in which the above compositions are dispersed) by agitating the paint with a disperser, to form the back coat plait.

| | |
|---|---|
| Fatty acid | 1 wt. part |
| Fatty acid ester | 1 wt. part |
| Fluorine denatured silicone oil | 1 wt. part |
| Polyisocyanate | 5 wt. parts |

EXAMPLE 2

Example 2 was obtained in the same method as with the case of Example 1, excepting that the added carbon black contained in the back coat layer was 7 parts by weight.

EXAMPLE 3

Example 3 was obtained in the same method as with the case of Example 1, excepting that the added carbon black contained in the back coat layer was 10 parts by weight.

EXAMPLE 4

Example 4 was obtained in the same method as with the case of Example 1, excepting that the added carbon black contained in the back coat layer was 15 parts by weight.

EXAMPLE 5

Example 5 was obtained in the same method as with the case of Example 1, excepting that the added carbon black contained in the back coat layer was 18 parts by weight.

EXAMPLE 6

Example 6 was obtained in the same method as with the case of Example 1, excepting that the added carbon black contained in the back coat layer was 20 parts by weight.

Comparative example 1

Comparative example 1 was obtained in the same method as with the case of Example 1, excepting that no carbon black was added to the back coat layer.

Comparative example 2

Comparative example 2 was obtained in the same method as with the case of Example 1, excepting that the added carbon black contained in the back coat layer was 3 parts by weight.

Comparative example 3

Comparative example 3 was obtained in the same method as with the case of Example 1, excepting that the added carbon black contained in the back coat layer was 4 parts by weight.

Comparative example 4

Comparative example 4 was obtained in the same method as with the case of Example 1, excepting that the added carbon black contained in the back coat layer was 21 parts by weight.

Comparative example 5

Comparative example 5 was obtained in the same method as with the case of Example 1, excepting that the added carbon black contained in the back coat layer was 22 parts by weight.

Comparative example 6

Comparative example 6 was obtained in the same method as with the case of Example 1, excepting that the added carbon black contained in the back coat layer was 25 parts by weight.

Comparative example 7

Comparative example 7 was obtained in the same method as with the case of Example 1, excepting that the added carbon black contained in the back coat layer was 30 parts by weight.

The above-mentioned Examples 1 to 6 and the Comparative examples 1 to 7 were evaluated by the following methods. Table 1 lists the evaluation results.

[Sample Tape Evaluation]

(1) Back coat layer frictional coefficient

Each of the back coat surfaces of the sample tapes was brought into contact with a 6-mm dia. metal pin (SUS 303) through 180 degrees. The tape tension was 50 g on the incoming side and the tape travel speed was 3.33 cm/sec. Under these conditions, the tension on the outgoing side Xg was measured to obtain the frictional coefficient of the tape in accordance with the following expression:

$$\text{Frictional coeff.} = (1/\pi)\ln(X/50)$$

(2) Tape tension during traveling

Each of the sample tapes was wound and housed as a VHS-C cassette tape. The length of each tape was 83 m. The example tape was set in a VHS video tape deck (SC-1000, made by VICTOR COMPANY OF JAPAN, LTD) for travel test. The tape tension during traveling was measured by use of a tension meter (unit: g).

(3) Tape edge damage measurement (mechanical strength)

Each of the sample tapes having a length of 83 m was wound and housed as a VHS-C cassette tape. The example tape was set in the VHS video tape deck (SC-1000, made by VICTOR COMPANY OF JAPAN, LTD) and then driven ten times. After traveling, damage at the tape edge (tape breakage, wrinkles, etc.) was observed by visual inspection. The damage degree evaluation was indicated by o when any damage was not found in comparison with the initial state, Δ when a slight damage was found, and x when a significant damage was found.

(4) Dynamic tape bucking strength measurement (mechanical strength)

Each of the sample tapes having a length of 83 m was wound and housed as a VHS-C cassette tape. The strength of the tape in the tape width direction was measured by use of a dynamic buckling strength measurement instrument.

Table 1 indicates that Comparative example tapes 1 to 3 are high in the dynamic buckling strength in the tape width direction. However, since the frictional coefficient of the back coat layer is also high, the tape tension during the traveling becomes high, so that the tape travel is unstable. As a result, edge damage (breakage, wrinkles, etc.) was found. Further, in the case of Comparative examples 4 to 7, since the quantity of the added carbon black is large, although the frictional coefficient of the back coat layer and the tape tension during traveling are both low, the dynamic buckling strength in the tape width direction is reduced markedly, so that the strength of the medium itself is low. As a result, the significant damage was found. As described above, in Comparative examples, when the tape thickness is reduced down

TABLE 1

| EXAMPLE/ COMP | CARBON BLACK (wt. parts) | BACK COAT FRICTION COEFF. | TRAVEL TAPE TENSION | EDGE DAMAGE | DYNAMIC BUCKING STRENGTH |
| --- | --- | --- | --- | --- | --- |
| EX 1 | 5 | 0.270 | 63.0 | o | 76.0 |
| EX 2 | 7 | 0.258 | 62.7 | o | 75.6 |
| EX 3 | 10 | 0.240 | 62.0 | o | 75.6 |
| EX 4 | 15 | 0.232 | 61.4 | o | 74.4 |
| EX 5 | 18 | 0.225 | 60.8 | o | 73.8 |
| EX 6 | 20 | 0.220 | 60.0 | o | 73.0 |
| COMP 1 | 0 | 0.340 | 70.0 | x | 80.0 |
| COMP 2 | 3 | 0.306 | 64.3 | Δ | 77.4 |
| COMP 3 | 4 | 0.301 | 64.0 | Δ | 76.8 |
| COMP 4 | 21 | 0.218 | 59.7 | Δ | 69.7 |
| COMP 5 | 22 | 0.213 | 59.4 | x | 69.0 |
| COMP 6 | 25 | 0.210 | 57.0 | x | 68.0 |
| COMP 7 | 30 | 0.180 | 55.0 | x | 60.0 |

EX: Example tape,
COMP: Comparative example tape to 12.5 μm or less in total thickness, it is impossible to obtain sufficient mechanical strength and travel stability as a practical recording medium.

In contrast with this, in Example tapes according to the present invention, since the dynamic buckling strength (mechanical strength) is high and the frictional coefficient of the back coat layer is low; that is, both the mechanical strength and the frictional coefficient can be compatible with each other. As a result, the tape tension during traveling is low, and further the edge damage (breakage, wrinkles, etc.) will not occur. In other words, in Example tapes (the carbon black powder is 5 or more but 20 or less in parts by weight, relative to the platelet inorganic powder of 100 parts by weight), in spite of the fact that the total thickness of the tape is as thin as 12.5 μm, it is possible to obtain both the practically sufficient mechanical strength and travel stability. Further, when the mechanical strength is considered as being more important, it is preferable that the carbon black powder is determined 5 or more but 10 or less in parts by weight relative to the platelet inorganic powder of 100 parts by weight.

Still other Examples and Comparative examples of the present invention will be described hereinbelow.

EXAMPLE 7

On the surface of polyethylene naphthalate layer with a thickness of 9.5 μm, a magnetic paint was applied by the following compositions and methods so that the magnetic coating with a thickness of 2.5 μm could be obtained. Further, the coated film was processed for magnetic orientation, dried, and further processed for calendering (for surface smoothing), to form a magnetic film with a thickness of 2.0 μm. After that, the back coat layer coating liquid as the back coat layer was applied on the surface on which the magnetic film (the polyethylene naphthalate layer) was not coated by the following compositions and methods so that the back coat layer with a thickness of 1.0 μm could be obtained after dried. Further, after the liquid coating, the coated film was processed for magnetic orientation, dried, and further processed for calendering (for surface smoothing), to form an original magnetic coated film rolled material (before slit off) with a total thickness of 12.5 μm or less. The original magnetic coated film material before slit off was heat treated at 50° C. for 60 hours for thermo-hardening. After that, the original magnetic coated film material was slit off to a recording tape with a width of 0.5 inch, as a video tape sample (Example 7).

| (1) Formation of magnetic paint Composition | |
| --- | --- |
| Co-γ-$Fe_2O_3$ magnetic powder | 100 wt. parts |
| Vinyl chloride-vinyl acetate copolymer | 10 wt. parts |
| Polyurethane resin | 10 wt. parts |
| α-alumina (average particle dia. 0.3 μm) | 6 wt. parts |
| Carbon black | 1 wt. part |
| Methyl-ethyl-ketone | 100 wt. parts |
| Toluene | 100 wt. parts |

The following additives were added to a magnetic paint (in which the above compositions are dispersed) by agitating the paint with a disperser, to form the magnetic paint.

| Stearic acid | 1 wt. part |
| --- | --- |
| Butyl stearate | 1 wt. part |

| -continued | |
| --- | --- |
| Polyisocyanate | 5 wt. part |

| (2) Formation of back coat paint Composition | |
| --- | --- |
| α-$Fe_2O_3$ (platelet inorganic powder) | 100 wt. parts |
| Carbon black | 7 wt. parts |
| Vinyl chloride-vinyl acetate copolymer | 7.5 wt. parts |
| Polyurethane resin | 7.5 wt. parts |
| Methyl-ethyl-ketone | 100 wt. parts |
| Toluene | 100 wt. parts |

The following additives were added to the back coat paint (in which the adore compositions are dispersed) by agitating the paint with a disperser, to form the back coat plait.

| Fatty acid | 1 wt. part |
| --- | --- |
| Fatty acid ester | 1 wt. part |
| Fluorine denatured silicone oil | 1 wt. part |
| Polyisocyanate | 5 wt. parts |

EXAMPLE 8

Example 8 was obtained in the same method as with the case of Example 7, excepting that the total amount of the binder (vinyl chloride-vinyl acetate copolymer and polyurethane resin) contained in the back coat layer was 20 parts by weight. Further, the mix rate of both resins was 1:1.

EXAMPLE 9

Example 9 was obtained in the same method as with the case of Example 7, excepting that the total amount of the binder (vinyl chloride-vinyl acetate copolymer and polyurethane resin) contained in the back coat layer was 25 parts by weight. Further, the mix rate of both resins was 1:1.

EXAMPLE 10

Example 10 was obtained in the same method as with the case of Example 7, excepting that the total amount of the binder (vinyl chloride-vinyl acetate copolymer and polyurethane resin) contained in the back coat layer was 30 parts by weight. Further, the mix rare of both resins was 1:1.

EXAMPLE 11

Example 11 was obtained in the same method as with the case of Example 7, excepting that the total amount of the binder (vinyl chloride-vinyl acetate copolymer and polyurethane resin) contained in the back coat layer was 35 parts by weight. Further, the mix rate of both resins was 1:1.

EXAMPLE 12

Example 12 was obtained in the same method as with the case of Example 7, excepting that the total amount of the binder (vinyl chloride-vinyl acetate copolymer and polyurethane resin) contained in the back coat layer was 40 parts by weight. Further, the mix rate of both resins was 1:1.

[Comparative example 8]

Comparative example 8 was obtained in the same method as with the case of Example 7, excepting that the total amount of the binder (vinyl chloride-vinyl acetate copolymer and polyurethane resin) contained in the back coat layer was 5 parts by weight. Further, the mix rate of both resins was 1:1.

[Comparative example 9]

Comparative example 9 was obtained in the same method as with the case of Example 7, excepting that the total amount of the binder (vinyl chloride-vinyl acetate copolymer and polyurethane resin) contained in the back coat layer was 10 parts by weight. Further, the mix rate of both resins was 1:1.

[Comparative example 10]

Comparative example 10 was obtained in the same method as with the case of Example 7, excepting that the total amount of the binder (vinyl chloride-vinyl acetate copolymer and polyurethane resin) contained in the back coat layer was 13 parts by weight. Further, the mix rate of both resins was 1:1.

[Comparative example 11]

Comparative example 11 was obtained in the same method as with the case of Example 7, excepting that the total amount of the binder (vinyl chloride-vinyl acetate copolymer and polyurethane resin) contained in the back coat layer was 42 parts by weight. Further, the mix rate of both resins was 1:1.

[Comparative example 12]

Comparative example 12 was obtained in the same method as with the case of Example 7, excepting that the total amount of the binder (vinyl chloride-vinyl acetate copolymer and polyurethane resin) contained in the back coat layer was 45 parts by weight. Further, the mix rare of both resins was 1:1.

[Comparative example 13]

Comparative example 13 was obtained in the same method as with the case of Example 7, excepting that the total amount of the binder (vinyl chloride-vinyl acetate copolymer and polyurethane resin) contained in the back coat layer was 50 parts by weight. Further, the mix rate of both resins was 1:1.

The above-mentioned Examples 7 to 12 and the Comparative examples 8 to 13 were evaluated by the following methods. Table 2 lists the evaluation results.

[Sample Tape Evaluation]
(1) Repeated travel durability test

Each of the sample tapes having a length of 83 m was wound and housed as a VHS-C cassette tape. The example tape was set in the VHS video tape deck (SC-1000, made by VICTOR COMPANY OF JAPAN, LTD) and then driven 100 times. After traveling, damage on the back coat layer side (scratches by each guide pole) was observed by visual inspection. The damage degree evaluation was indicated by o when any damage was not found in comparison with the initial state, Δ when a slight damage was found, and x when a significant damage was found or when the tape travel was abnormal (e.g., the tape travel stop midway in test).

(2) D/O (Drop-Out) measurement after repeated travel test

Each of the sample tapes having a length of 83 m was wound and housed as a VHS-C cassette tape. The example tape was set in the VHS video tape deck (SC-1000, made by VICTOR COMPANY OF JAPAN, LTD) and then driven 100 times. After traveling, the drop out (−16db in 15 μs) was measured by use of a drop-out counter (VHOICZ, made by SHIBASOKU Corp.)

(3) Tape edge damage measurement (mechanical strength)

Each of the sample tapes having a length of 83 m was wound and housed as a VHS-C cassette tape. The example tape was set in the VHS video tape deck (SC-1000, made by VICTOR COMPANY OF JAPAN, LTD) and then driven ten times. After traveling, damage at the tape edge (breakage, wrinkles, etc.) was observed by visual inspection. The damage degree evaluation was indicated by o when any damage was not found in comparison with the initial state, Δ when a slight damage was found, and x when a significant damage was found.

(4) Dynamic tape bucking strength measurements (mechanical strength)

Each of the sample tapes having a length of 83 m was wound and housed as a VHS-C cassette tape. The strength of the tape in the tape width direction was measured by use of a dynamic buckling strength measurement instrument.

Table 2 indicates that Comparative example tapes 8 to 10 are high in the dynamic buckling strength (the mechanical strength of the magnetic tape) because the mix rate of the binder is low. Conversely, however, it was confirmed that the dispersibility was slightly lowered, so that slight scratches were found on the back coat side in the durability test after the repeated tape traveling or that the recording performance

TABLE 2

| EXAMPLE/ COMP | BINDER (wt. parts) | REPEATED TRAVEL TEST | D/O VALUE AFT TRAVEL | EDGE DAMAGE | DYNAMIC BUCKING STRENGTH |
| --- | --- | --- | --- | --- | --- |
| EX 7 | 15 | Δ | 10 | o | 75.8 |
| EX 8 | 20 | o | 12 | o | 75.2 |
| EX 9 | 25 | o | 8 | o | 74.7 |
| EX 10 | 30 | o | 13 | o | 74.0 |
| EX 11 | 35 | o | 7 | o | 73.6 |
| EX 12 | 40 | o | 5 | o | 73.6 |
| COMP 8 | 5 | Δ | 37 | Δ | 77.3 |
| COMP 9 | 10 | Δ | 34 | Δ | 76.4 |
| COMP 10 | 13 | Δ | 28 | Δ | 76.2 |
| COMP 11 | 42 | o | 9 | Δ | 72.7 |
| COMP 12 | 45 | o | 11 | Δ | 71.0 |
| COMP 13 | 50 | o | 6 | Δ | 69.3 |

EX: Example tape,
COMP: Comparative example tape slightly deteriorated in the drop-out test after the tape traveling. Further, in Comparative example tapes 11 to 13, since the mix rate of the binder was high, although it was confirmed that relatively excellent test results were obtained in the scratches on the back coat side and drop-out values in the repeated traveling durability test, the dynamic buckling strength had a tendency of decrease, so that it was confirmed the tendency of the deterioration of the edge damage.

In contrast with this, in Examples of the present invention, since the mix rate of the binder and the platelet inorganic powder was determined to an appropriate value in the back coat layer, the dispersibility was excellent. In addition, since the filling density of the inorganic powder was determined in a sufficient range, the magnetic tapes were excellent with respect to both the scratches and the drop-out measurement values in the repeated travel durability test. Further, it was confirmed that the dynamic buckling strength and the edge damage were both excellent. The above-mentioned tests indicate that it is desirable that the mix rate of the binder is 15 parts by weight or more but 40 parts by weight or less, when the platelet inorganic powder is 100 parts by weight, in order to obtain practically sufficient mechanical strength and the travel stability, in spite of the fact that the magnetic recording tape is as thin as 12.5 µm in total thickness.

As described above, in the magnetic recording medium according to the present invention, although the total thickness thereof is reduced down to as thin as 12.5 µm, it is possible to obtain a sufficient mechanical strength and a sufficient travel stability at the same time, while preventing damage such as breakage, wrinkles, etc.

What is claimed is:

1. A magnetic recording medium having a magnetic layer formed on one side surface of a non-magnetic support and a back coat layer formed on the other side of the non-magnetic support, the back coat layer being composed of a solid powder and a binder, wherein a thickness of the back coat layer is 1.0 µm or less, and a total thickness of the magnetic recording medium is 12.5 µm or less;

the solid powder contains platelet inorganic powder and carbon black powder in such a mix rate that the carbon black powder is between 5 and 20 parts by weight, relative to 100 parts by weight of the platelet inorganic powder, an average particle diameter of the platelet inorganic powder lying between 0.5 and 3.0 µm and a platelet aspect ratio of the particle diameter to thickness thereof lying between 30 and 50, and an average particle diameter of the carbon black powder lying between 20 and 300 nm; and the binder and the platelet inorganic powder are mixed in such a mix rate that the binder is between 15 and 40 parts by weight, relative to 100 parts by weight of the platelet inorganic powder.

2. The magnetic recording medium of claim 1, wherein the platelet inorganic powder is any one of or a mixture of substances selected from the group consisting of $\alpha$—$Fe_2O_3$, Ba—Fe, kaolin, mica, and zinc oxide.

3. The magnetic recording medium of claim 1, wherein the carbon black powder is any one of or a mixture of black substances selected from the group consisting of furnace black, thermal black, black for color, and acetylene black.

* * * * *